Patented Oct. 1, 1929

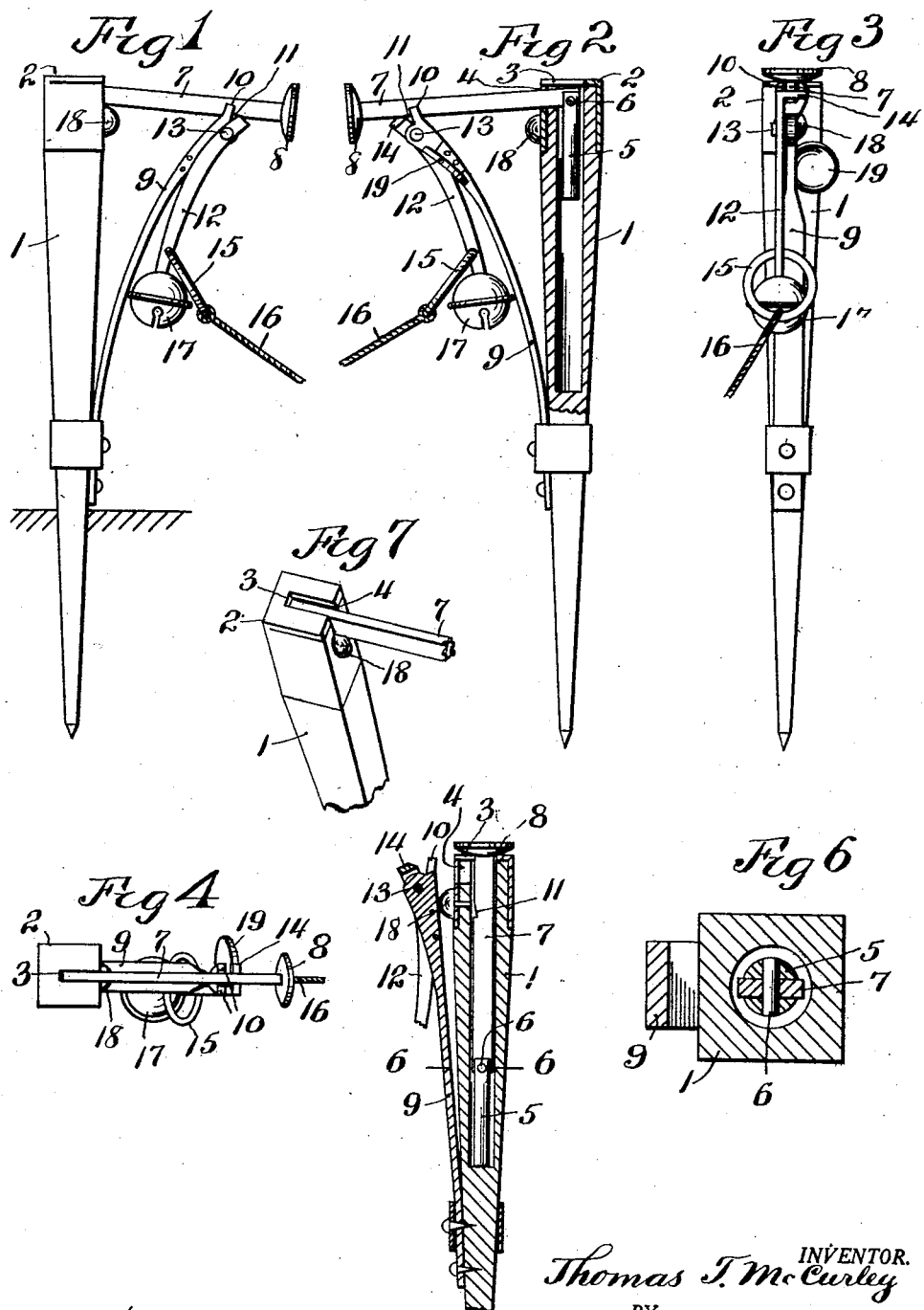

1,729,646

UNITED STATES PATENT OFFICE

THOMAS T. McCURLEY, OF KANSAS CITY, MISSOURI

FISHING APPLIANCE

Application filed April 16, 1928. Serial No. 270,500.

My invention relates to improvements in fishing appliances. One of the objects of my invention is to provide a fishing appliance of novel construction, which, when set and the fishing line with which it is provided is baited and set, will automatically hook the fish, and at the same time will give an alarm to notify the fisherman that a fish is on the line.

A further object of my invention is to provide a novel fishing appliance which is simple, cheap, durable, not liable to get out of order, which is easily set in operative condition, and which is reliable in its operation, and which can be disposed in compact form for transportation or storing.

The novel features of my invention are hereinafter fully described and claimed.

In the accompanying drawing, which illustrates the preferred embodiment of my invention, Fig. 1 is a side elevation, looking at one side, showing my improved appliance set in the ground and in operative condition.

Fig. 2 is a similar view of the same looking from the other side, parts being shown in vertical section.

Fig. 3 is a front elevation of the same.

Fig. 4 is a top view of the same.

Fig. 5 is a central vertical sectional view of the same, a lower portion of the stake being broken away.

Fig. 6 is an enlarged section on the line 6—6 of Fig. 5.

Fig. 7 is a perspective view of an upper portion of the stake and a part of the detent member.

Similar characters of reference designate similar parts in the different views.

1 designates a support comprising a stake adapted to be forced into the ground or mounted in any other manner in a stationary position.

The upper portion of the stake 1 is tubular and has mounted on it a cap 2 having in its top a slot 3 which registers with a slot 4 in the front side of the cap 2 and stake 1.

Slidable in the upper end of the stake 1 is a weight 5 the upper end of which is pivoted on a horizontal axis, by means of a pin 6 to one end of a detent member comprising a flat bar 7 having at its other end a thumb piece 8, and which is adapted to be slid in the stake 1 from the vertical housed position shown in Fig. 5 and swung to the laterally extending operative position shown in Figs. 1, 2, 4 and 7.

A spring bar 9 is fastened rigidly at its lower end to the front side of the stake 1, and at its upper end is provided with two upwardly extending fingers 10 adapted to receive between them the detent member 7, which in its lower edge is provided with a notch 11, Fig. 5, adapted to receive the upper end of the spring bar 9, when the latter is sprung to the tensioned position, shown in Figs. 1 and 2, and to releasably hold the spring bar in said sprung position.

For having the detent member 7 automatically released from the spring bar 9, there is pivoted to said spring bar a trigger 12, by means of a horizontal pin 13. The trigger 12 has a lateral projection 14 adapted to engage the under edge of the detent member 7 and swing the latter upwardly out of holding engagement with the spring bar 9, which on being released will by its tension spring to the position shown in Fig. 5.

Attached to the trigger 12 is a ring 15 to which is attached a fishing line 16. At the lower end of the trigger 12 is mounted an alarm device, which may be, as shown, a bell 17, corresponding to an ordinary sleigh bell.

As a cushion for receiving the blow of the released spring bar 9, there is mounted on the front and upper part of the stake 1 a pad 18, which may be of soft rubber.

In setting the device, the spring bar 9 is pulled forwardly at its upper end to the position shown in Figs. 1 and 2, the spring bar being provided at one side near its upper end with a finger piece 19, Figs. 2, 3 and 4, the detent member 7 having first been pulled upwardly and swung forwardly to the position shown in Figs. 1 and 2, the thumb of the operating hand bearing on the thumb piece, while the finger is engaged with the finger piece 19 to spring outwardly the spring bar 9.

The spring bar is pulled outwardly and the detent member is depressed until the upper end of the spring bar enters the notch 11, in which position when the spring bar is released from engagement with the hand of the operator, it will be held in the sprung position.

The baited line 16 is then set in the water where the fishing is to be done. When a fish seizes the bait, the line 16 will be jerked, thus swinging the trigger 12 against the detent member 7, thus releasing said detent member from the spring bar, which, on being released, will spring to its initial position, thus carrying with it the trigger 12 and giving the line 16 a jerk, which will cause the hook on the line to engage and hold the fish. The jerking of the fish on the line 16 will sound the alarm bell 17, thus warning the fisherman that a fish has been hooked.

After the fish has been removed from the line and the hook rebaited, the line is again cast in the water, and the spring bar 9 and detent member 7 are reengaged, as before described.

After the spring bar 9 has been sprung, it will swing the detent member 7 upwardly, upon which the weight 5 will pull the detent member downwardly through the slot 3 to the position shown in Fig. 5.

When the fishing has been finished, the stake is pulled from the ground and the parts will then be as shown in Fig. 5, thus forming a compact body, which may be readily carried in the pocket or stored in small space. The line 16 may be wound around the stake 1.

I do not limit my invention to the structure shown and described, as modifications, within the scope of the appended claims may be made without departing from the spirit of my invention.

What I claim is:

1. A fishing appliance comprising a support, a spring fastened thereto, a detent member carried by and adapted to be fulcrumed on said support and having means for releasably engaging and holding said spring in a sprung position, and a releasing trigger pivoted to said spring and having means for having attached thereto and movable by a fishing line to a position in which it will engage and release said detent member from said spring.

2. In a fishing appliance, a tubular support, a spring fastened thereto, a detent member movable to and from a housed position in said support and arranged to be partly withdrawn from said support and swung upon the latter as a fulcrum to and from a position in which it will engage and releasably hold said spring in a sprung position, and means carried by said spring and adapted to have attached thereto and movable to a releasing position by a fishing line and arranged, when so moved to engage and release said detent member from engagement with said spring.

3. In a fishing appliance, a tubular support, a spring fastened thereto, a detent member movable to and from a housed position in said support and arranged to be partly withdrawn from said support and swung upon the latter as a fulcrum to and from a position in which it will engage and releasably hold said spring in a sprung position, a releasing trigger carried by said spring and adapted to have a fishing line attached thereto and movable by said line to engage and release said detent member from said spring.

4. In a fishing appliance, a support, a spring fastened thereto, a detent member movable on said support to and from a position in which it will engage and releasably hold said spring in a sprung position, a releasing trigger carried by said spring and adapted to have attached thereto and movable thereby a fishing line to a position in which it will engage and release said detent member from said spring, and an alarm device carried by said trigger and adapted to be actuated to give an alarm when said line jerks on said trigger.

In testimony whereof I have signed my name to this specification.

THOMAS T. McCURLEY.